United States Patent [19]
Hara et al.

[11] Patent Number: 5,027,415
[45] Date of Patent: Jun. 25, 1991

[54] BILL DISCRIMINATING APPARATUS

[75] Inventors: Kazuhiro Hara, Chiba; Kiyosi Fujii, Tokyo, both of Japan

[73] Assignee: Laurel Bank Machines Co., Ltd., Tokyo, Japan

[21] Appl. No.: 356,138

[22] Filed: May 24, 1989

[30] Foreign Application Priority Data

May 31, 1988 [JP] Japan ................................ 63-133214

[51] Int. Cl.[5] ................................................ G06K 9/00
[52] U.S. Cl. ........................................... 382/7; 356/71
[58] Field of Search .................... 382/7; 250/205, 556; 356/72, 71; 209/534

[56] References Cited

U.S. PATENT DOCUMENTS 4,618,257 10/1986 Bayne et al. ............................ 382/7

FOREIGN PATENT DOCUMENTS 62-296292 12/1987 Japan .

*Primary Examiner*—Leo H. Boudreau
*Attorney, Agent, or Firm*—Fleit, Jacobson, Cohn, Price, Holman & Stern

[57] ABSTRACT

A bill discriminating apparatus having a light emitter for emitting light onto bills and two color detectors for selectively and photoelectrically detecting light components contained in light emitted from the light emitter and transmitted through or reflected by the bills to be discriminated and having different wavelengths, each being for outputting signals corresponding to a detected amount of the light component, the bill discriminating apparatus including two reference color detectors for selectively and photoelectrically detecting light contained in light emitted from the light emitter and having different wavelengths, each being for outputting signals corresponding to a detected amount of light, a correction value calculator for calculating a ratio of signals output from the two reference color detectors, a corrector for correcting the signals output from one of the two color detectors based upon signals output from the correction value calculator, a differential amplifier for differentially amplifying a difference between signals output from the corrector and the signals output from the other of the two color detectors, a divider for dividing signals output from the differential amplifier by the signals output from the other of the two color detectors and a discriminator for discriminating denominations and/or genuineness of the bills based upon signals output from the divider. The thus constituted apparatus makes it possible to discriminate denominations and/or genuineness of bills without fail.

14 Claims, 1 Drawing Sheet

BILL DISCRIMINATING APPARATUS

CROSS REFERENCE OF RELATED APPLICATIONS

The present invention relates generally to the subject matter of the following prior U.S. patent applications: Ser. No. 07/056,716, filed on June 2, 1987, entitled "Paper Money Discriminator," now U.S. Pat. No. 4,881,268, and Ser. No. 07/116,210, filed on Nov. 3, 1987, entitled "Bill Discriminating Device".

BACKGROUND OF THE INVENTION

The present invention relates to a bill discriminating apparatus, and more particularly to such an apparatus capable of discriminating denominations and/or genuineness of bills without fail by detecting colors of bills.

DESCRIPTION OF THE PRIOR ART

There are known bill discriminating apparatuses for discriminating denominations and/or genuineness of bills by detecting colors of bills.

For example, unexamined Japanese Patent Publication No. 62(1987)-296292 corresponding to the U.S. patent application Ser. No. 07/056,716 proposes a bill discriminating apparatus in which a plurality of color sensors are provided in the longitudinal direction of bills being transported, each color sensor comprising a pair of color detecting means for detecting different color components of light transmitted through or reflected by bills from each other, ratios of two kinds of color components detected by the color sensors are calculated in time series to produce time-series patterns of bills and denominations and/or genuineness of bills are discriminated by comparing the thus produced time-series patterns of bills with reference patterns of bills experimentally obtained and memorized.

In this bill discriminating apparatus, two colors to be detected are selected from three primary colors and the bill discrimination is conducted based upon ratios of the components of two colors contained in light transmitted through or reflected by bills. However, since ratios of the three primary color components contained in light emitted from a light source are not always constant and they change with elapse of time or change in temperature etc., ratios of the three primary color components contained in light emitted from the light source and transmitted though or reflected by bills inevitably change with the change in the ratios of the three primary color components contained in light emitted from the light source. Therefore, even if the same portion of the same kind of bills is detected, the detected ratio of the two color components will be different from that detected previously or at a different temperature. Further, if the ratios of the three primary color components contained in light emitted from the light source change with elpse of time or change in temperature etc., the ratios of the three primary color components contained in light emitted from the light source during detection are inevitably different from that when the reference patterns were produced. Accordingly, even if the ratio of two specific color components contained in light transmitted through or reflected by a bill is detected and a pattern of time-series change in this ratio is compared with the reference patterns, it is impossible to discriminate denominations and/or genuineness of bills with sufficiently high accuracy.

SUMMARY OF THE INVENTION

It is, therefore, an object of the present invention to provide a bill discriminating apparatus capable of discriminating denominations and/or genuineness of bills without fail by detecting colors of bills.

Another object of the present invention is to provide a bill discriminating apparatus capable of discriminating denominations and/or genuineness of bills without fail by detecting colors of bills even in cases where ratios of the three primary color components contained in light emitted from a light source change with elapse of time or change in temperature etc.

According to the present invention, the above and other objects can be accomplished by a bill discriminating apparatus having light emitting means for emitting light onto bills and two color detecting means for selectively and photoelectrically detecting light components contained in light emitted from said light emitting means and transmitted through or reflected by the bills to be discriminated and having different wavelengths, each being for outputting signals corresponding to a detected amount of the light component, said bill discriminating apparatus comprising two reference color detecting means for selectively and photoelectrically detecting light contained in light emitted from said light emitting means and having different wavelengths, each being for outputting signals corresponding to a detected amount of light, correction value calculating means for calculating a ratio of signals output from said two reference color detecting means, correction means for correcting the signals output from one of said two color detecting means based upon signals output from said correction value calculating means, differential amplifying means for differentially amplifying a difference between signals output from said correction means and the signals output from the other of said two color detecting means, dividing means for dividing signals output from said differential amplifying means by the signals output from said other of said two color detecting means and discriminating means for discriminating denominations and/or genuineness of the bills based upon signals output from said dividing means.

The above and other objects and features of the present invention will become apparent from the following description made with reference to an accompanying drawing.

DESCRIPTION OF THE PREFERRED EMBODIMENT

Figure 1:
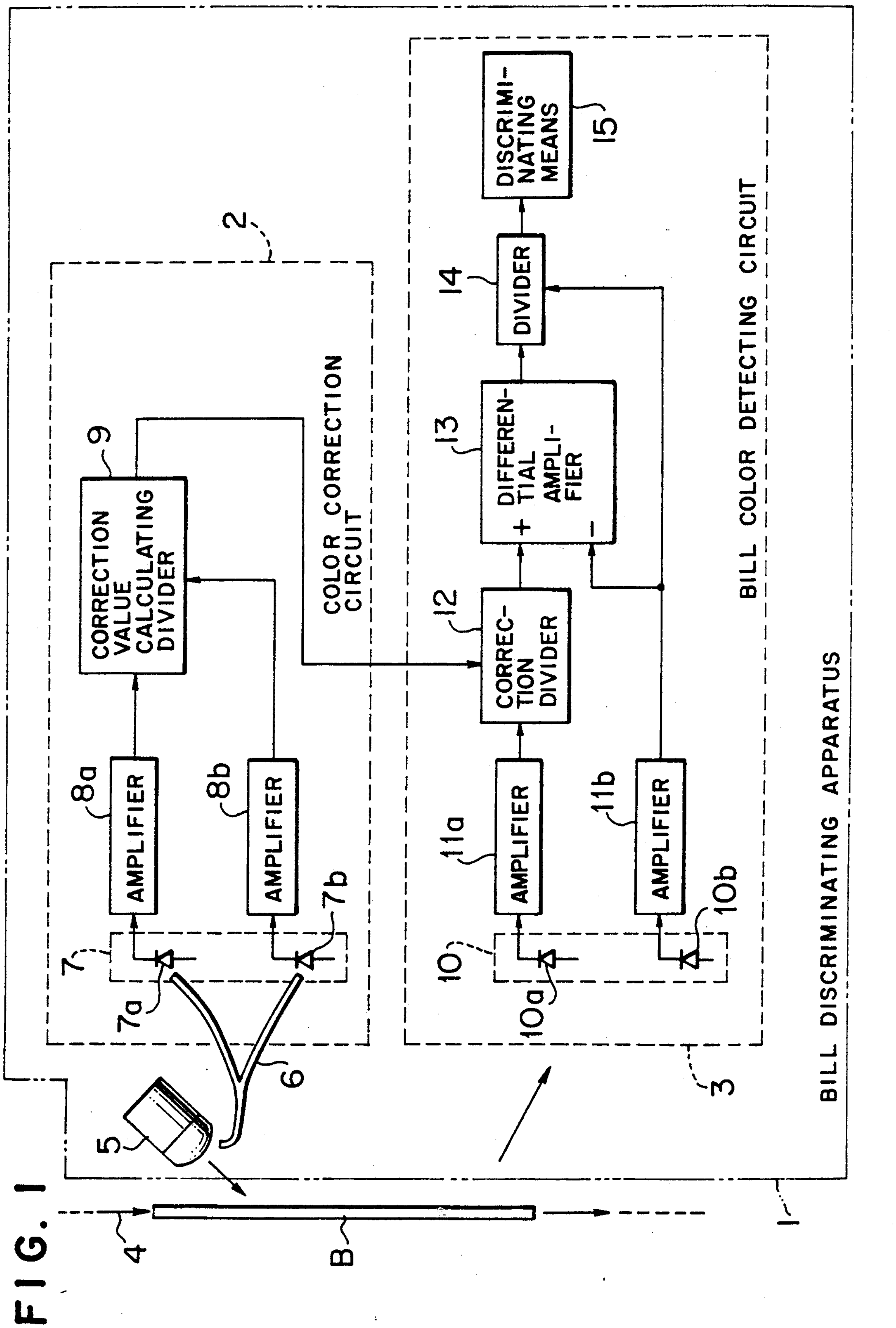
FIG. 1 is a schematic block diagram of a bill discriminating apparatus which is an embodiment of the present invention.

Referring to FIG. 1, a bill discriminating apparatus 1 which is an embodiment of the present invention is provided with a color correction circuit 2, a bill color detecting circuit 3 and a light emitter 5 for emitting light to bills B being transported along a bill transporting path 4 so as to scan the bills B line by line.

The color correction circuit 2 is provided with a correction color sensor 7 for photoelectrically detecting color components contained in light emitted from a light emitter 5 and led by a light transmitting means 6 such as optical fibers.

The correction color sensor 7 comprises a reference green light detecting element *7a* and a reference red light detecting element 7b. The reference green light detecting element 7a and the reference red light detecting element 7b have selective sensitivity to the spectra of the green light and the red light and detect only a green light component and a red light component contained in light emitted from the light emitter 5. Each of the reference green light detecting element 7a and the reference red light detecting element 7b can output current corresponding to a detected amount of the light component.

Supposing that the sensitivity to the green light component of the reference green light detecting element 7a is $S_G$, the sensitivity to the red light component of the reference red light detecting element 7b is $S_R$, the intensity of the green light component contained in light emitted from the light emitter 5 is $x_G$ and the intensity of the red light component contained in light emitted from the light emitter 5 is $x_R$, then, current $I_G$ output from the reference green light detecting element 7a and current $I_R$ output from the reference red light detecting element 7b will be:

$$I_G = C_G S_G x_G \ldots \quad (1)$$

$$I_R = C_R S_R x_R \ldots \quad (2)$$

wherein $C_G$ and $C_R$ are constants determined by optical characteristics of the light transmitting means 6 for transmitting light emitted from the light emitter 5 to the reference green light detecting element 7a and the reference red light detecting element 7b respectively.

The output currents $I_G$, $I_R$ of the reference green light detecting element 7a and the reference red light detecting element 7b are converted to voltages and amplified by amplifiers 8a and 8b having gains $A_G$, $A_R$ respectively.

The outputs of the amplifiers 8a, 8b are input into a correction value calculating divider 9 where the output of the amplifier 8a is divided by the output of the amplifier 8b, and the correction value calculating divider 9 outputs a voltage $V_C$.

$$V_C = D_{C1} A_G I_G / A_R I_R \ldots \quad (3)$$

wherein $D_{C1}$ is a characteristic coefficient of the correction value calculating divider 9.

On the other hand, the bill color detecting circuit 3 is provided with a color sensor 10 for photoelectrically detecting light emitted from the light emitter 5 and reflected by the bills being transported along the bill transporting path 4.

The color sensor 10 comprises a green light detecting element 10a and a red light detecting element 10b. The green light detecting element 10a and the red light detecting element 10b have selective sensitivity to the spectra of the green light and the red light in the same manner as the reference green light detecting element 7a and the reference red light detecting element 7b, and detect only a green light component and a red light component contained in light reflected by the bills B. Each of the green light detecting element 10a and the red light detecting element 10b can output current corresponding to a detected amount of the light component.

Supposing that the sensitivity to the green light component of the green light detecting element 10a is $S_1$, the sensitivity to the red light component of the red light detecting element 10b is $S_2$, the ratio of the green light component to all color components contained in light emitted from the light emitter 5 is $R_G$ and the ratio of the red light component to all components contained in light emitted from the light emitter 5 is $R_R$, then, current $I_1$ output from the green light detecting element 10a and current $I_2$ output from the red light detecting element 10b will be:

$$I_1 = C_1 S_1 x_G R_G \ldots \quad (4)$$

$$I_2 = C_2 S_2 x_R R_R \ldots \quad (5)$$

wherein $C_1$ and $C_2$ are constants determined by arrangements of the light emitter 5, the green light detecting element 10a and the red light detecting element 10b.

The currents output from the green light detecting element 10a and the red light detecting element 10b are converted to voltages and amplified by amplifiers 11a and 11b having gains $A_1$ and $A_2$ respectively.

Voltage $A_1 I_1$ output from the amplifier 11a is input into a correction divider 12 and, on the other hand, the voltage $V_C$ output from the correction value calculating divider 9 is also input into the correction divider where the output voltage $A_1 I_1$ of the amplifier 11a is divided by the output voltage $V_C$ of the correction value calculating divider 9. Then, the correction divider 12 outputs voltage $V_0$.

$$V_0 = D_{C2} A_1 I_1 \cdot A_R I_R / D_{C1} A_G I_G \ldots (6)$$

wherein $D_{C2}$ is a characteristic coefficient of the correction divider 12.

The output voltage $V_0$ of the correction divider 12 and the output voltage $A_2 I_2$ of the amplifier 11b are input into a differential amplifier 13 where they are differentially amplified. Then, the differential amplifier 13 outputs voltage $V_1$ to a divider 14.

$$V_1 = A_D (V_0 - A_2 I_2) \ldots \quad (7)$$

wherein $A_D$ is the gain of the differential amplifier 13.

Further, the output voltage A2I2 is input into the divider 14 where the output voltage V1 of the differential amplifier 13 is divided by the output voltage A2I2 of the amplifier 11b and the divider 14 outputs voltage V to a discriminating means 15.

$$\begin{aligned} V &= DV_1/A_2I_2 \\ &= DA_D(V_0 - A_2I_2)/A_2I_2 \\ &= DA_D(D_{C2}A_1I_1A_RI_R/D_{C1}A_GI_G - A_2I_2)/A_2I_2 \end{aligned} \quad (8)$$

wherein D is a characteristic coefficient of the divider 14

The thus obtained output voltage V of the divider 14 is free from the influence of change in the ratios of the three primary color components contained in light emitted from the light emitter 5 and depends upon only the ratio of the green light component and the red light component contained in light reflected by the bills B, if the sensitivity ratio $S_G/S_R$ of the reference green light detecting element 7a and the reference red light detecting element 7b and the sensitivity ratio $S_1/S_2$ of the green light detecting element 10a and the red light detecting element 10b are initially set to be the same.

More specifically, supposing that the formulas (1), (2), (4), (5) and $S_G/S_R = S_1/S_2$ are substituted for the formula (8), then, $$V = DA_D(JKLMNR_G/R_R - 1) \ldots \quad (9)$$

wherein $J = A_1/A_2$, $K = A_R/A_G$, $L = D_{C2}/D_{C1}$, $M = C_R/C_G$, and $N = C_1/C_2$.

Since $DA_D$, J, K, L, M and N are constants, the output voltage V of the divider 14 is determined by only the ratio $R_G/R_R$ of the green light component and the red light component contained in light reflected by the bills. In addition, since the sensitivity $S_G$, $S_R$, $S_1$ and $S_2$ of the reference green light detecting element 7*a*, the reference red light detecting element 7*b*, the green light detecting element 10*a* and the red light detecting element 10*b* changes similarly with elapse of time or change in temperature etc., their sensitivity ratios of $S_G/S_R$ and $S_1/S_2$ are kept constant with elapse of time or change in temperature etc. Therefore, if the sensitivity ratio $S_G/S_R$ of the reference green light detecting element 7*a* and the reference red light detecting element 7*b* and the sensitivity ratio $S_1/S_2$ of the green light detecting element 10*a* and the red light detecting element 10*b* are initially set to be the same, even if the ratios of the three primary color components contained in light emitted from the light emitter 5 change with elapse of time or change in temperature etc., the influence of change in the ratios of the three primary color components contained in light emitted from the light emitter 5 on the output voltage V of the divider 14 is eliminated and the divider 14 always outputs the voltage V depending upon only the ratio of the green light component and the red light component contained in light reflected by the bills B.

Thus, the output voltage V of the divider 14 free from change in the ratios of the three primary color components contained in light emitted from the light emitter 5 is fed to the discriminating means 15 where denominations and genuineness of the bills B are discriminated.

Reference patterns for respective denominations of the bills B are stored in advance in the discriminating means 15 and the time-series pattern of the signals which have been detected by scanning the bills B line by line by the light emitter 5 and on which the above described signal processings have been conducted is compared with the reference patterns and the denomination and the genuineness of the bills B are discriminated depending upon agreement between the detected pattern and one of the reference patterns.

According to the above described embodiment, since even in the case where the ratios of the three primary color components contained in light emitted from the light emitter 5 change with elapse of time or change in temperature etc., the output of the green light detecting element 10*a* is corrected by the correction circuit 2 and the difference between the thus corrected output of the green light detecting element 10*a* and the output of the red light detecting element 10*b* is divided by the output of the red light detecting element 10*b*, it is possible to completely eliminate the influence of the ratios of the three primary color components contained in light emitted from the light emitter 5 from the detection signal, whereby the denominations and genuineness of bills can be discriminated with sufficiently high accuracy.

As described in detail with reference to the preferred embodiment, according to the present invention, it is possible to provide a bill discriminating apparatus capable of discriminating denominations and genuineness of bills without fail by detecting colors of bills.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, although the light emitted from the light emitter 5 is detected by the reference green light detecting element 7*a* and the reference red light detecting element 7*b* which have selective sensitivity to the spectra of the green light component and the red light component and photoelectrically detect only the green light component and the red light component contained in the emitted light, and the light reflected from the bills B is detected by the green light detecting element 7*a* and the red light detecting element 7*b* which respectively have selective sensitivity to the spectra of the green light component and the red light component and photoelectrically detect only a green light component and a red component contained in the reflected light from the bills B, specific wavelengths of light can instead be detected using photoelectrically detecting elements provided with filters capable of transmitting the green light component or the red light component on the front face thereof.

Further, in the above described embodiment, although red light and green light are selectively detected among the three primary colors in the color correction circuit 2 and the bill color detecting circuit 3, red light and blue light, green light and blue light or red light, green light and blue light may be selectively detected.

Still further, in the above described embodiment, although the reflected light from the bill B is detected, light transmitted through the bills B can instead be detected by arranging the light emitter 5 on the opposite side of the color sensor 10 across the bill transporting path 4.

Moreover, in the above described embodiment, although red light and green light are selectively detected among the three primary colors in the color correction circuit and the bill color detecting circuit 3, it is possible to further provide a reference blue light detecting element and a blue light detecting element and to detect and correct a red light component and a green light component, a red light component and a blue light component, and a green light component and a blue light component in parallel in the same manner as the above described embodiment.

Further, in the above described embodiment, although the reference green light detecting element 7*a* and the green light detecting element 10*a* have selective sensitivity to only a green light component and the reference red light detecting element 7*b* and the red light detecting element 10*b* have selective sensitivity to only a red light component, even if the former elements have some sensitivity to other light components than the green light component and the latter elements have some sensitivity to other light components than the red light component, if the ratio of the sensitivity characteristics of the reference green light detecting element 7*a* and the green light detecting element 10*a* and that of the reference red light detecting element 7*b* and the red light detecting element 10_b_ are set to be same, the same effect can be obtained.

Furthermore, in the above described embodiment, although the bills B are scanned line by line by light emitted from the light emitter 5, the bills B may be scanned point by point by light emitted from the light emitter 5.

We claim:

1. A bill discriminating apparatus having light emitting means for emitting light onto bills and two color detecting means for selectively and photoelectrically detecting light components contained in light emitted from said light emitting means and transmitted through the bills to be discriminated and having different wavelengths, each being for outputting signals corresponding to a detected amount of the light component, said bill discriminating apparatus comprising two reference color detecting means for selectively and photoelectrically detecting light contained in light emitted from said light emitting means and having different wavelengths, each being for outputting signals corresponding to a detected amount of light, correction value calculating means for calculating a ratio of signals output from said two reference color detecting means, correction means for correcting the signals output from one of said two color detecting means based upon signals output from said correction value calculating means, differential amplifying means for differentially amplifying a difference between signals output from said correction means and the signals output from the other of said two color detecting means, dividing means for dividing signals output from said differential amplifying means by the signals output from said other of said two color detecting means and discriminating means for discriminating at least one of denomination and genuineness of the bills based upon signals output from said dividing means.

2. A bill discriminating apparatus in accordance with claim 1 wherein said two color detecting means comprise green light detecting means and red light detecting means for selectively and photoelectrically detecting a green light component and a red light component contained in the light emitted from said light emitting means and transmitted through the bills to be discriminated respectively, and said two reference color detecting means comprise reference green light detecting means and reference red light detecting means for selectively and photoelectrically detecting a green light component and a red light component contained in the light emitted from said light emitting means respectively.

3. A bill discriminating apparatus in accordance with claim 2 which further includes two amplifying means for respectively converting said signals output from said green light detecting means and said red light detecting means to voltages and amplifying them, and two amplifying means for respectively converting said signals output from said reference green light detecting means and said reference red light detecting means to voltages and amplifying them.

4. A bill discriminating apparatus in accordance with claim 1 wherein said two color detecting means comprise red light detecting means and blue light detecting means for selectively and photoelectrically detecting a red light component and a blue light component contained in the light emitted from said light emitting means and transmitted through by the bills to be discriminated respectively, and said two reference color detecting means comprise reference red light detecting means and reference blue light detecting means for selectively and photoelectrically detecting a red light component and a blue light component contained in the light emitted from said light emitting means respectively.

5. A bill discriminating apparatus in accordance with claim 4 which further includes two amplifying means for respectively converting said signals output from said red light detecting means and said blue light detecting means to voltages and amplifying them, and two amplifying means for respectively converting said signals output from said reference red light detecting means and said reference blue light detecting means to voltages and amplifying them.

6. A bill discriminating apparatus in accordance with claim 1 wherein said two color detecting means comprise green light detecting means and blue light detecting means for selectively and photoelectrically detecting a green light component and a blue light component contained in the light emitted from said light emitting means and transmitted through the bills to be discriminated respectively, and said two reference color detecting means comprise reference green light detecting means and reference blue light detecting means for selectively and photoelectrically detecting a green light component and a blue light component contained in the light emitted from said light emitting means respectively.

7. A bill discriminating apparatus in accordance with claim 6 which further includes two amplifying means for respectively converting said signals output from said green light detecting means and said blue light detecting means to voltages and amplifying them, and two amplifying means for respectively converting said signals output from said reference green light detecting means and said reference blue light detecting means to voltages and amplifying them.

8. A bill discriminating apparatus having light emitting means for emitting light onto bills and two color detecting means for selectively and photoelectrically detecting light components contained in light emitted from said light emitting means and reflected by the bills to be discriminated and having different wavelengths, each being for outputting signals corresponding to a detected amount of the light component, said bill discriminating apparatus comprising two reference color detecting means for selectively and photoelectrically detecting light contained in light emitted from said light emitting means and having different wavelengths, each being for outputting signals corresponding to a detected amount of light, correction value calculating means for calculating a ratio of signals output from said two reference color detecting means, correction means for correcting the signals output from one of said two color detecting means based upon signals output from said correction value calculating means, differential amplifying means for differentially amplifying a difference between signals output from said correction means and the signals output from the other of said two color detecting means, dividing means for dividing signals output from said differential amplifying means by the signals output from said other of said two color detecting means and discriminating means for discriminating at least one of denomination and genuineness of the bills based upon signals output from said dividing means.

9. A bill discriminating apparatus in accordance with claim 8 wherein said two color detecting means comprise green light detecting means and red light detecting means for selectively and photoelectrically detecting a green light component and a red light component contained in the light emitted from said light emitting means and reflected by the bills to be discriminated respectively, and said two reference color detecting means comprise reference green light detecting means and reference red light detecting means for selectively and photoelectrically detecting a green light component and a red light component contained in the light emitted from said light emitting means respectively.

10. A bill discriminating apparatus in accordance with claim 9 which further includes two amplifying means for respectively converting said signals output from said green light detecting means and said red light detecting means to voltages and amplifying them, and two amplifying means for respectively converting said signals output from said reference green light detecting means and said reference red light detecting means to voltages and amplifying them.

11. A bill discriminating apparatus in accordance with claim 8 wherein said two color detecting means comprise red light detecting means and blue light detecting means for selectively and photoelectrically detecting a red light component and a blue light component contained in the light emitted from said light emitting means and reflected by the bills to be discriminated respectively, and said two reference color detecting means comprise reference red light detecting means and reference blue light detecting means for selectively and photoelectrically detecting a red light component and a blue light component contained in the light emitted from said light emitting means respectively.

12. A bill discriminating apparatus in accordance with claim 11 which further includes two amplifying means for respectively converting said signals output from said red light detecting means and said blue light detecting means to voltages and amplifying them, and two amplifying means for respectively converting said signals output from said reference red light detecting means and said reference blue light detecting means to voltages and amplifying them.

13. A bill discriminating apparatus in accordance with claim 8 wherein said two color detecting means comprise green light detecting means and blue light detecting means for selectively and photoelectrically detecting a green light component and a blue light component contained in the light emitted from said light emitting means and reflected by the bills to be discriminated respectively, and said two reference color detecting means comprise reference green light detecting means and reference blue light detecting means for selectively and photoelectrically detecting a green light component and a blue light component contained in the light emitted from said light emitting means respectively.

14. A bill discriminating apparatus in accordance with claim 13 which further includes two amplifying means for respectively converting said signals output from said green light detecting means and said blue light detecting means to voltages and amplifying them, and two amplifying means for respectively converting said signals output from said reference green light detecting means and said reference blue light detecting means to voltages and amplifying them.

* * * * *